(12) United States Patent
McCann et al.

(10) Patent No.: US 6,936,319 B2
(45) Date of Patent: Aug. 30, 2005

(54) MOLDED TUBE OF IMPROVED PERFORMANCE

(75) Inventors: John G. McCann, Pittsfield, MA (US);
Daniel S. Banner, Torrington, CT (US);
Louis S. Beres, III, Bantan, CT (US);
Joseph A. Repp, Hollis, NH (US);
Robert E. Alquesta, East Canaan, CT (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 225 days.

(21) Appl. No.: 10/051,608

(22) Filed: Jan. 17, 2002

(65) Prior Publication Data

US 2003/0153679 A1 Aug. 14, 2003

(51) Int. Cl.⁷ .............................. B29D 23/00; B01L 3/14
(52) U.S. Cl. ........................ 428/36.8; 428/36.9; 604/19; 422/914; 422/916; 422/918; 525/232; 525/241

(58) Field of Search ............................ 604/19; 422/914, 422/916, 918; 525/232, 241, 95, 98, 191, 331.9; 428/35.7, 36.8, 36.9

(56) References Cited

U.S. PATENT DOCUMENTS

| 4,371,663 A | | 2/1983 | Russell |
| 5,248,729 A | | 9/1993 | Inoue et al. |
| 5,466,499 A | * | 11/1995 | Takagi et al. ............... 428/36.9 |
| 5,753,326 A | * | 5/1998 | Blackwelder ............... 428/34.9 |
| 6,270,866 B1 | * | 8/2001 | Okuda et al. ............... 428/35.1 |

FOREIGN PATENT DOCUMENTS

| JP | 56-045190 | * | 4/1981 | ............ C12M/3/00 |

* cited by examiner

Primary Examiner—Thao T. Tran
(74) Attorney, Agent, or Firm—Nanette S. Thomas

(57) ABSTRACT

A tube, preferably a centrifuge tube, molded of a blend of 25–35 weight percent of polystyrene and 75–65 weight percent of styrene-butadiene rubber block copolymer has improved performance compared to a tube of pure copolymer.

10 Claims, 1 Drawing Sheet

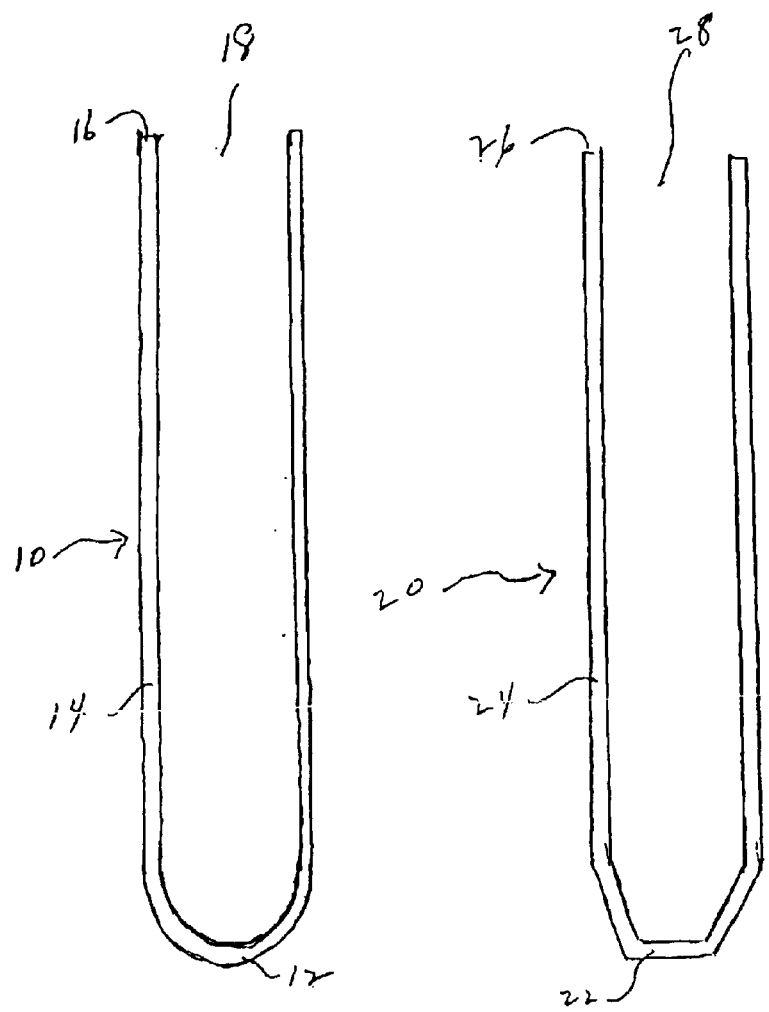
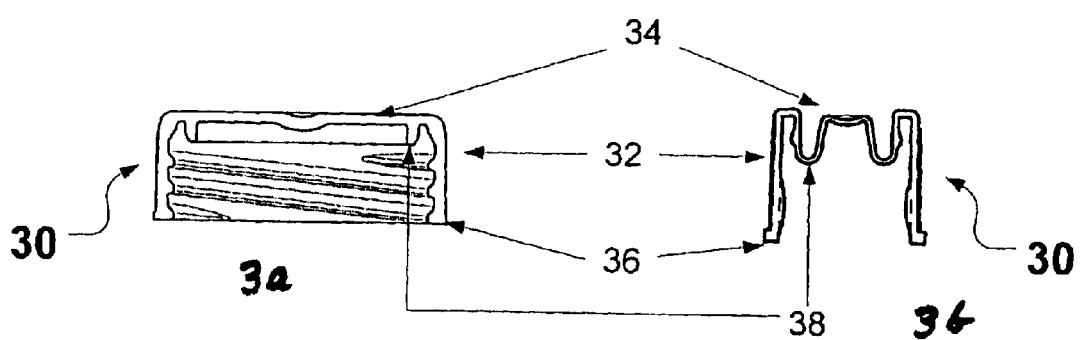
Figure 3

MOLDED TUBE OF IMPROVED PERFORMANCE

FIELD OF THE INVENTION

This invention relates to tubes for medical applications, and more particularly relates to centrifuge tubes having decreased deformation and leakage in use.

BACKGROUND OF THE INVENTION

Tubes for medical applications have traditionally been made of glass. Glass is advantageous because of its clarity, recycleability and freedom from any morphological changes, but suffers from the severe disadvantage of breakability. In recent years, plastic has come to the fore as a replacement for glass in fabrication of medical tubes. Plastic provides the advantages of lower breakage than glass, less weight in shipment and easier disposal by incineration.

For small medical tubes (10 ml or less), polystyrene (PS) has conventionally been the plastic of choice because of its ease of injection molding and high clarity. It does, however, shatter easily due to inherent brittleness, a disadvantage which is magnified when fabricated into tubes of larger capacity. For this reason, larger tubes have conventionally been made of styrene-butadiene copolymer (S-Bu), styrene-butadiene-styrene terpolymer (S-Bu-S), and crosslinked blends of S-Bu and S-Bu-S or other elastomers. Such compositions are disclosed in U.S. Pat. No. 4,371,663 and in U.S. Pat. No. 5,248,729.

While improved polystyrene compositions have been disclosed, there is yet a need in the art for still better compositions combining the excellent clarity of polystyrene with the toughness of styrene-butadiene elastomers. This invention is directed to fulfulling this need.

SUMMARY OF THE INVENTION

A tube is injection molded of a blend of PS having a melt flow index of 7–11 g/10 min and S-Bu having a melt flow index of 10–12 g/10 min. The PS present in the blend may be between 25 and 35, preferably 28–32, most preferably 29.5–30.5 weight percent of the total polymer. The tube may be of any shape, preferably a conventional round bottom tube, most preferably a conventional centrifuge tube. Tubes of blends within the recited limits of polystyrene have improved performance, particularly diminished leakage or plastic deformation, compared to otherwise identical tubes of 100% S-Bu.

The tube may be sterilized with radiation, and may be provided with a hermetically sealed closure.

Another aspect of the invention is an assembly including the tube and an appropriate closure.

BRIEF DESCRIPTION OF THE DRAWINGS

FIGS. 1 and 2 are perspective views of typical round bottom and centrifuge tubes respectively in accordance with the invention; and FIGS. 3a and 3b are perspective views of suitable closures.

DETAILED DESCRIPTION

While this invention is satisfied by embodiments in many different forms, there will herein be described in detail embodiments of the invention with the understanding that the present disclosure is to be considered as exemplary of the principles of the invention and is not intended to limit the invention to the embodiments illustrated and described. The scope of the invention will be measured by the appended claims and their equivalents.

The present invention is directed to a particular composition providing articles of superior strength, non-brittleness, rigidity and clarity when injection molded. While the composition may be used for fabrication of any medical article for which the above properties are advantageous, it is particularly well suited for tubes, and the invention will be described in detail below for the preferred centrifuge tube of the invention.

The composition of the invention includes two resins which, when blended within the specified range, may be injection molded into the tube of the invention.

The first component of the blend is a general purpose PS having a melt flow rate of 7–11 gm/10 min when measured in accordance with ASTM D 1238. This commercially available material is standard in the art for injection molding of small tubes, and is available from BASF under the trade name POLYSTYROL® 147F.

The second component of the composition is a high clarity S-Bu rubber block copolymer having a melt flow rate of 10–12 gm/10 min when tested according to ASTM 1238. A suitable product is available from BASF under the tradename STYROLUX® 684D.

The two components may be blended in a ratio of 25–35 preferably 28–32, most preferably 29.5–30.5% by weight of the PS.

The blend may be conventionally injection molded into the tube of the invention. While tubes of any size are contemplated in the invention, preferred tubes are standard 50 ml centrifuge tubes.

After molding, the tube may be sterilized using gamma or electron beam radiation. Any dose of radiation up to a maximum of 23 Kgy may be used.

In another aspect of the invention, an assembly includes the tube of the invention and a hermetically sealed closure for the tube.

Adverting now to the drawings, FIGS. 1 and 2 illustrate a test tube and a centrifuge tube respectively of the invention. In FIG. 1, test tube 10 has a closed bottom wall portion 12 and a side wall portion 14 continuous therewith. Side wall portion 14 has a top edge 16 and defines an open top end 18. In FIG. 2, centrifuge tube 20 has closed bottom wall portion 22, side wall portion 24 continuous therewith and top edge 26 defining open top end 28.

FIGS. 3a and 3b illustrate conventional screw cap and snap cap type closures 30 for open ends 18 and 28 of the tubes of FIGS. 1 and 2. Closures 30 include an upper portion 32 having a top 34. Upper portion 32 has a lower lip 36 which extends over top edges 16 and 26 of the tubes when the closure is in the tube. Closures 30 also include an internal portion 38 which forms a hermetic interference fit with the inside wall surface of the tubes.

It is understood that other closure designs may be used wherein the tubes may or may not have molded threads for receiving a conventional plug type cap.

In accordance with the invention, tubes molded from the disclosed blend of PS and S-Bu have been found to have unexpectedly improved strength and resistance to deformation as measured by diminished craze (Example 2) and leakage through either the cap area or the gate location. Data in support thereof is tabulated in the following experimental section.

Experimental

Fifty ml centrifuge tubes were injection molded from blends of S-Bu having a melt flow index of 10–12 g/10 min and 25, 30 and 35% by weight of general purpose PS having a melt flow index of 7–11 g/10 min. Testing was performed as follows:

a) after 30 min at room temperature
b) after 21 days at 60° C. (accelerated aging simulating shelf life)
c) after sterilizing with 23 KGy radiation
d) for evidence of craze (defined below)

In the tables below, n is the number of tubes in the particular test, and the 0% PS column provides comparative data against tubes of the prior art made of 100% S-Bu.

EXAMPLE 1

Vacuum Leak Testing

A dark red aqueous solution was prepared by dissolving 20 g of conventional food coloring in 1000 ml water. Tubes to be tested were filled to just below the top with the red dye solution and an appropriate cap applied. Each tube was wrapped with a piece of white absorbent paper and the paper slid upward until in contact with the closure, and then affixed with tape. The tubes were placed closure-down in a vacuum chamber (Precision Theca) and the pressure in the chamber was maintained at 10 mm Hg for 5 min. A second group of tubes was aged for 21 days at 60° C. The tubes were removed and the absorbent paper examined carefully for any trace of leakage of the red dye. Any tube showing leakage was scored as failure.

|  | % failure (n = 50) | |
| --- | --- | --- |
| Composition | Non aged | Aged |
| 0% PS | 0 | 12 |
| 25% PS | 0 | nt |
| 30% PS | 0 | 6 |
| 35% PS | 0 | nt | nt—not tested

EXAMPLE 2

Centrifuge Testing

The red dye solution from Example 1 was added to tubes to be tested, the tubes were hermetically closed and placed in the centrifuge (IEC Centra). The tubes were spun for 11 min at 3200 rpm (2000RCF) and removed from the centrifuge. Each tube was inspected carefully for the presence of red dye leakage, and the gate stubs were placed on clean white absorbent paper. Any trace of red on the paper was indicative of leakage and the tube was scored as a failure.

A second group of tubes was sterilized with 23 Kgy radiation.

When tested according to this procedure, the following results were obtained wherein leakage during centrifugation is generally associated with plastic deformation or craze resulting from the spinning.

| A-Effect of Percentage of PS Blended with S-Bu | | | | | | | | |
| --- | --- | --- | --- | --- | --- | --- | --- | --- |
| | | 0% PS | | 25% PS | | 30% PS | | 35% PS |
| rpm | RCF | n | failed | n | failed | n | failed | n | failed |
| 3500 | 2350 | 50 | 2 | 12 | 0 | 48 | 1 | nt | |
| 4000 | 3075 | 12 | 0 | 24 | 2 | 24 | 1 | 12 | 2 |
| 5500 | 5800 | 24 | 1 | nt | | 48 | 5 | 12 | 10 |
| 6500 | 8130 | 12 | 2 | 12 | 0 | 11 | 0 | nt | |
| 7000 | 9430 | 20 | 3 | 48 | 2 | 36 | 1 | nt | |

It is evident from this experiment that the failure rate is high for the 35% PS blend whereas the 25 and 30% PS blends are comparable to pure S-Bu. It is concluded from this experiment that 35% is the high end of suitable compositions.

| B-Effect of Sterilizing dose (23 Kgy) of Radiation | | | | | |
| --- | --- | --- | --- | --- | --- |
| | | 0% PS | | 30% PS | |
| rpm | RCF | n | failed | n | failed |
| 4000 | 3075 | 12 | 1 | 12 | 0 |
| 5000 | 4800 | 12 | 2 | 12 | 1 |
| 6000 | 6925 | 12 | 6 | 12 | 1 |

This experiment shows that radiation sterilization is more detrimental to the pure S-Bu tube than it is to the preferred 30/70 PS-S-Bu tube of the invention.

| C-Effect of Aging | | | | | |
| --- | --- | --- | --- | --- | --- |
| | | 0% PS | | 30% PS | |
| rpm | RCF | n | failed | n | failed |
| 3500 | 2350 | 12 | 4 | 12 | 0 |
| 4000 | 3075 | 12 | 7 | 12 | 7 |
| 5500 | 5800 | 12 | 8 | 12 | 10 |

This experiment shows that the preferred 30% blend of the invention has improved stability compared to pure S-Bu after aging when tested at the lower rpm conventionally used for centrifugation, but has about the same failure rate at higher rpm.

EXAMPLE 3

Craze Testing

Craze is an art term for internal stress lines which occur during centrifugation, generally due to plastic deformation, and may be accompanied by color change and opacity. The following craze scale was used:

0—no craze
1—few marks (less than ¼")
2—repetitive marks (less than 1")
3—many marks (greater than 1")
4—some deformation, no interference
5—bulging, interference with removal from holder
6—excessive bulging When tested for craze under the centrifugation conditions set forth in Example 2, the following results were obtained:

|  | CRAZE RATING | | | |
| --- | --- | --- | --- | --- |
| RCF | 0% | 25% | 30% | 35% |
| 3075 | 2 | 2.5 | 2 | 2 |
| 5800 | 3.5 | 3.5 | 3.5 | 4 |
| 8130 | 4 | 4 | 4 | nt |
| 9430 | 4 | 4 | 4 | nt |

Examination of the data in this table shows craze to increase at higher RCF and PS percentage.

What is claimed is:

1. A medical tube comprising sidewalls and a closed end, said sidewalls and closed end consisting essentially of a blend of 25–35 weight percent polystyrene, based upon total weight of the polymer, having a melt flow index of 7–11 g/10 min and 75–65 weight percent styrene-butadiene rubber block copolymer having a melt flow index of 10–12 g/10 min, said tube having diminished leakage or plastic deformation compared to identical, in size and shape, tubes of pure styrene-butadiene copolymer.

2. The tube of claim 1, which is a round bottom tube.

3. The tube of claim 1, which is a centrifuge tube.

4. The tube of claim 1, which is sterilized with gamma radiation.

5. The tube of claim 4, wherein said radiation has a maximum dose of 23 Kgy.

6. The tube of claim 1, wherein said tube is a centrifuge tube and said blend consists essentially of 28–32 weight percent of polystyrene having a melt flow index of 7–11 g/10 min and 72–68 weight percent, based upon total weight of the polymer, of styrene-butadiene rubber block copolymer having a melt flow index of 10–12 g/min.

7. The tube of claim 1, wherein said tube is a centrifuge tube and said blend consists essentially of 29.5–30.5 weight percent, based upon total weight of the polymer, of polystyrene having a melt flow index of 7–11 g/10 min and 70.5–69.5 weight percent of styrene-butadiene rubber block copolymer having a melt flow index of 10–12 g/10 min.

8. An assembly comprising the tube of claim 1, and a hermetically sealed closure therefor.

9. The tube of claim 1, wherein said blend consists essentially of 28–32 weight percent, based upon total weight of the polymer, of polystyrene having a melt flow index of 7–11 g/10 min and 72–68 weight percent of styrene-butadiene rubber block copolymer.

10. The tube of claim 1, wherein said blend consists essentially of 29.5–30.5 weight percent, based upon total weight of the polymer, of polystyrene having a melt flow index of 7–11 g/10 min and 70.5–69.5 weight percent of styrene-butadiene rubber block copolymer.

* * * * *